United States Patent [19]

Ohtani et al.

[11] Patent Number: 5,528,194
[45] Date of Patent: Jun. 18, 1996

[54] APPARATUS AND METHOD FOR PERFORMING GEOMETRIC TRANSFORMATIONS ON AN INPUT IMAGE

[75] Inventors: Shingo Ohtani; Mikita Yasuda, both of Tokyo, Japan

[73] Assignee: Sony Corporation, Tokyo, Japan

[21] Appl. No.: 877,104

[22] Filed: May 1, 1992

[30] Foreign Application Priority Data

May 13, 1991 [JP] Japan ................... 3-135284
Dec. 6, 1991 [JP] Japan ................... 3-348587

[51] Int. Cl.⁶ .................................. G06T 3/00
[52] U.S. Cl. .................. 382/293; 382/154; 348/147; 348/580
[58] Field of Search .................. 382/44, 45, 46, 382/41, 293, 154, 276, 295, 296; 358/209, 227, 22, 160; 348/147, 580, 581, 583

[56] References Cited

U.S. PATENT DOCUMENTS

| | | | |
|---|---|---|---|
| 4,412,121 | 10/1983 | Kremers et al. | 219/124.34 |
| 4,566,036 | 1/1986 | Kadosawa | 358/209 |
| 4,633,503 | 12/1986 | Hinman | 382/47 |
| 4,667,236 | 5/1987 | Dresdner | 348/581 |
| 4,752,828 | 6/1988 | Chapuis et al. | 358/22 |
| 4,939,459 | 7/1990 | Akachi et al. | 324/247 |
| 4,956,706 | 9/1990 | Ohba | 358/93 |
| 4,975,976 | 12/1990 | Kimata et al. | 382/44 |
| 5,067,019 | 11/1991 | Juday et al. | 358/160 |
| 5,121,210 | 6/1992 | Hirayama | 358/183 |
| 5,185,667 | 2/1993 | Zimmermann | 382/44 |
| 5,227,889 | 7/1993 | Yoneyama et al. | 358/209 |

FOREIGN PATENT DOCUMENTS

| | | |
|---|---|---|
| 0360155 | 3/1990 | European Pat. Off. . |
| 2633474 | 12/1989 | France . |
| 2127649 | 4/1984 | United Kingdom ............ 358/209 |

OTHER PUBLICATIONS

Computer Graphicsand Image Processing, vol. 13, No.3, 7/80 EPO Search Report.

Primary Examiner—Joseph Mancuso
Assistant Examiner—Larry J. Prikockis
Attorney, Agent, or Firm—Ronald P. Kananen

[57] ABSTRACT

An image transforming apparatus comprising a means for holding an input image signal, a means for holding geometric parameters for the image signal in a photographing mode, a processing means for geometrically transforming the image signal by the use of such geometric parameters, and a means for outputting the image signal transformed geometrically by the processing means. There is also provided a method of transforming an input image by employing the above apparatus to realize a tilting process and a depth-effect emphasizing process for the image obtained from a video camera, an electronic still camera or the like.

22 Claims, 13 Drawing Sheets

POSITIONAL RELATIONSHIP BETWEEN COORDINATE SYSTEMS IN PROJECTIVE TRANSFORMATION

PROJECTED CUBOID SUBJECT

FIG. IOA
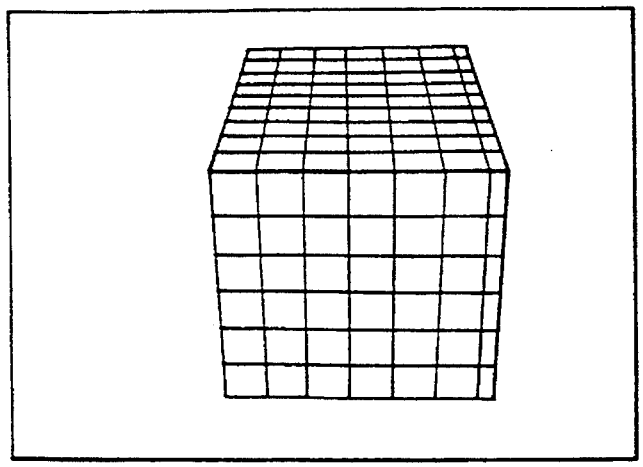
FIG. IOB
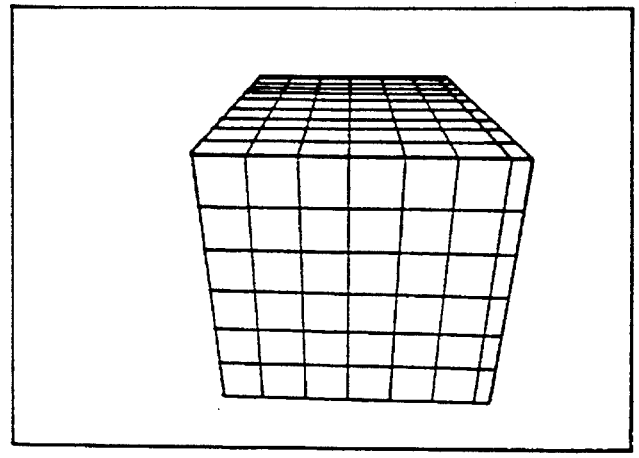
FIG. IOC
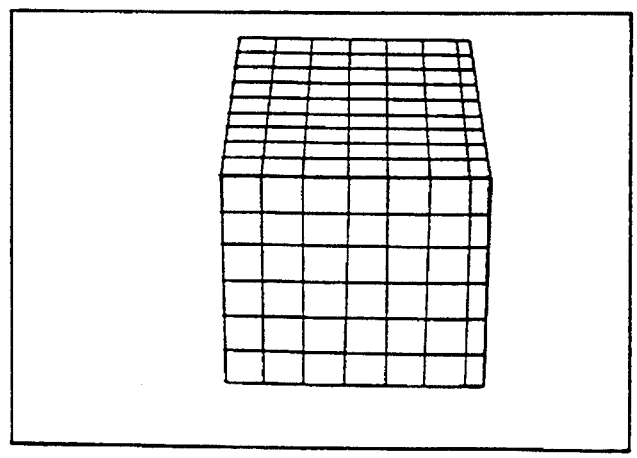

FIG. IIA
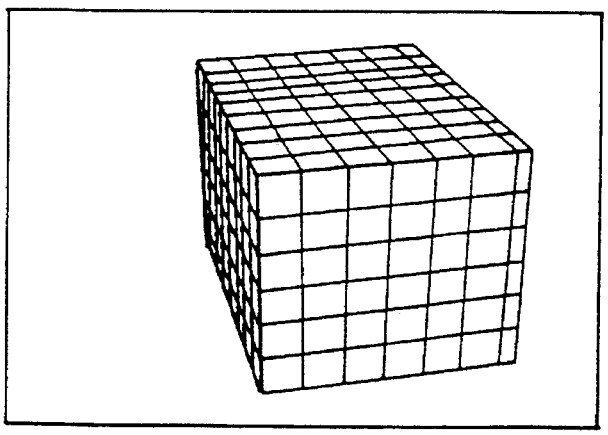
FIG. IIB
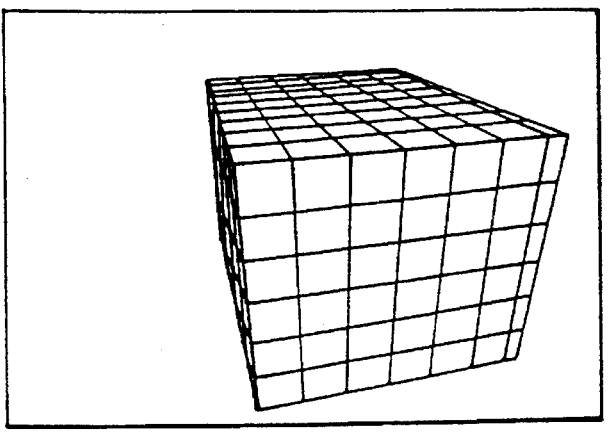
FIG. IIC
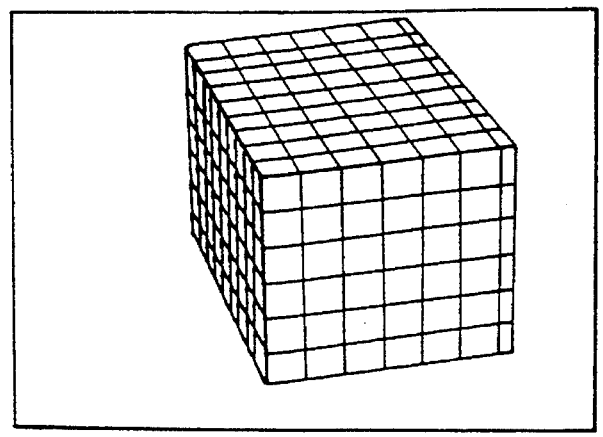

APPARATUS AND METHOD FOR PERFORMING GEOMETRIC TRANSFORMATIONS ON AN INPUT IMAGE

BACKGROUND OF THE INVENTION

1. Field of the Invention

The present invention relates to an apparatus and a method for transforming an input image signal through a desired process and outputting a transformed image.

2. Description of the Prior Art

When subjects are photographed with a camera in an ordinary manner, the intrinsic dimensional relationship of the subjects is not captured with accuracy due to the optical characteristics of the camera, and the subject (portion) positionally closer to the camera is formed into a larger image as compared with any other subject of the same dimensions at a longer distance from the camera.

In photographing an article to be listed in a catalog for example, it is generally customary to take a shot from above obliquely so that the front and the top of the article can be seen.

FIG. 13 illustrates an exemplary case of photographing a television receiver (subject) 1 by a camera 2 shown in a side view with respect to both the television receiver 1 and the camera 2, wherein a shot is taken at a depression angle θ as viewed from the camera 2. However, in such photography, a subject portion positionally closer to the camera is formed into a larger image as mentioned, so that the entire image obtained becomes top-heavy as shown in FIG. 14 where the downward vertical lines are inclined inwardly.

In order to correct such unnatural image, it has been known heretofore that an operation termed "tilt" is performed by the use of a large-sized studio camera (film camera) called "view camera". The "tilt" is an operation for adjusting a film plane from (A–B) to (A'–B') as illustrated in FIG. 15 so that the film plane (A–B) in the camera 2 becomes parallel with the subject (a–b).

Normally the optical axis J of a lens L is perpendicular to the film plane (A–B), and when such "tilt" is performed for adjusting the film plane to (A'–B'), it is necessary to change the right angle formed by the film plane with the optical axis J of the lens L.

For this purpose, the image-forming focal plane (film plane) is rotated substantially by an angle θ in conformity with the depression angle θ' to the subject, as illustrated in FIG. 16, by the use of a large-sized studio camera with bellows or the like. In such photography, geometric transformation is executed optically to obtain a picture of FIG. 17 where vertical lines are substantially parallel with one another.

However, the tilting operation mentioned above is complicated in practice and requires a considerably long time to set correctly. This results in the disadvantage that, in case the amount of the tilt needs to be corrected in any stage posterior to start of the photographing, it is necessary to repeat the procedure over again from the initial setting, consequently bringing about extreme inefficiency.

In an attempt to shorten the period of time required from photographing to printing, it is preferred to use a video camera or an electronic still camera. However, none of such cameras is equipped with a function which performs the tilting operation.

Regardless of whether a photographing means is a film camera, an electronic still camera or a video camera, the depth effect of a subject in its photographed image is determined by a shooting position and the focal length of a lens. Therefore, when the depth effect needs to be adjusted, it is necessary to shift the shooting position or to change the lens. This in turn requires restarting the photographing processes all over again, thereby further complicating the entire work.

OBJECT AND SUMMARY OF THE INVENTION

It is an object of the present invention to provide an apparatus and a method for geometrically transforming an input image signal and outputting a transformed image through a tilting process or a depth-effect emphasizing process.

According to one aspect of the present invention, there is provided an image transforming apparatus comprising an image holding means for holding an input image signal; a parameter holding means for holding geometric parameter signals in a photographing mode with regard to the input image signal; an image processing means for executing geometric transformation of the image signal by the use of the geometric parameter signals; and a means for outputting the image signal transformed geometrically by the image processing means. The input image signal is a still image signal obtained from a video camera; and the geometric parameter signals are composed of at least a video angle data signal, a focal length data signal and a relative angle data signal of the video camera to a subject in the photographing mode; and the image signal is geometrically transformed by the use of the geometric parameter signals, whereby the subject is outputted as the geometrically transformed image signal.

According to another aspect of the present invention, there is provided an image transforming method which comprises the steps of holding an input image signal; holding geometric parameter signals in a photographing mode with regard to the input image signal; executing geometric transformation of the image signal by the use of the geometric parameter signals; and outputting the image signal transformed geometrically in the image processing step.

By use of such an apparatus and method which are capable of transforming an input image signal on the basis of the geometric parameters used in the photographing mode, the process corresponds to known tilting operations. The invention can thereby be used with any image obtained from a video camera or an electronic still camera. Further, it can provide the additional function of adjusting the amount of the tilt after termination of the shot.

The image obtained by means of a camera can be regarded as a result of projecting a subject onto a plane. Therefore, by calculating the three-dimensional position coordinates of the subject and the optical-axis direction of the camera from the subject image, it becomes possible to obtain a transformed image where the viewing position coordinates and the focal length have been changed as desired. For example, the input image signal can be transformed into an image obtained by a wide-angle lens with an imaginary approach to the subject from the actual shooting position, or into an image obtained by a telephotographic lens at an imaginary longer distance to the subject from the actual shooting position.

The above and other features and advantages of the present invention will become apparent from the following description which will be given with reference to the illustrative accompanying drawings.

BRIEF DESCRIPTION OF THE DRAWINGS

FIGS. 10 to 12 illustrate exemplary images transformed through a depth-effect emphasizing process in the apparatus of the invention;

DESCRIPTION OF THE PREFERRED EMBODIMENT

Hereinafter the constitution of an embodiment of the present invention will be described, and thereafter a description will be given sequentially on a first image transformation (with a tilting process) and a second image transformation (with a depth-effect emphasizing process) realized in the embodiment.

Figure 1:
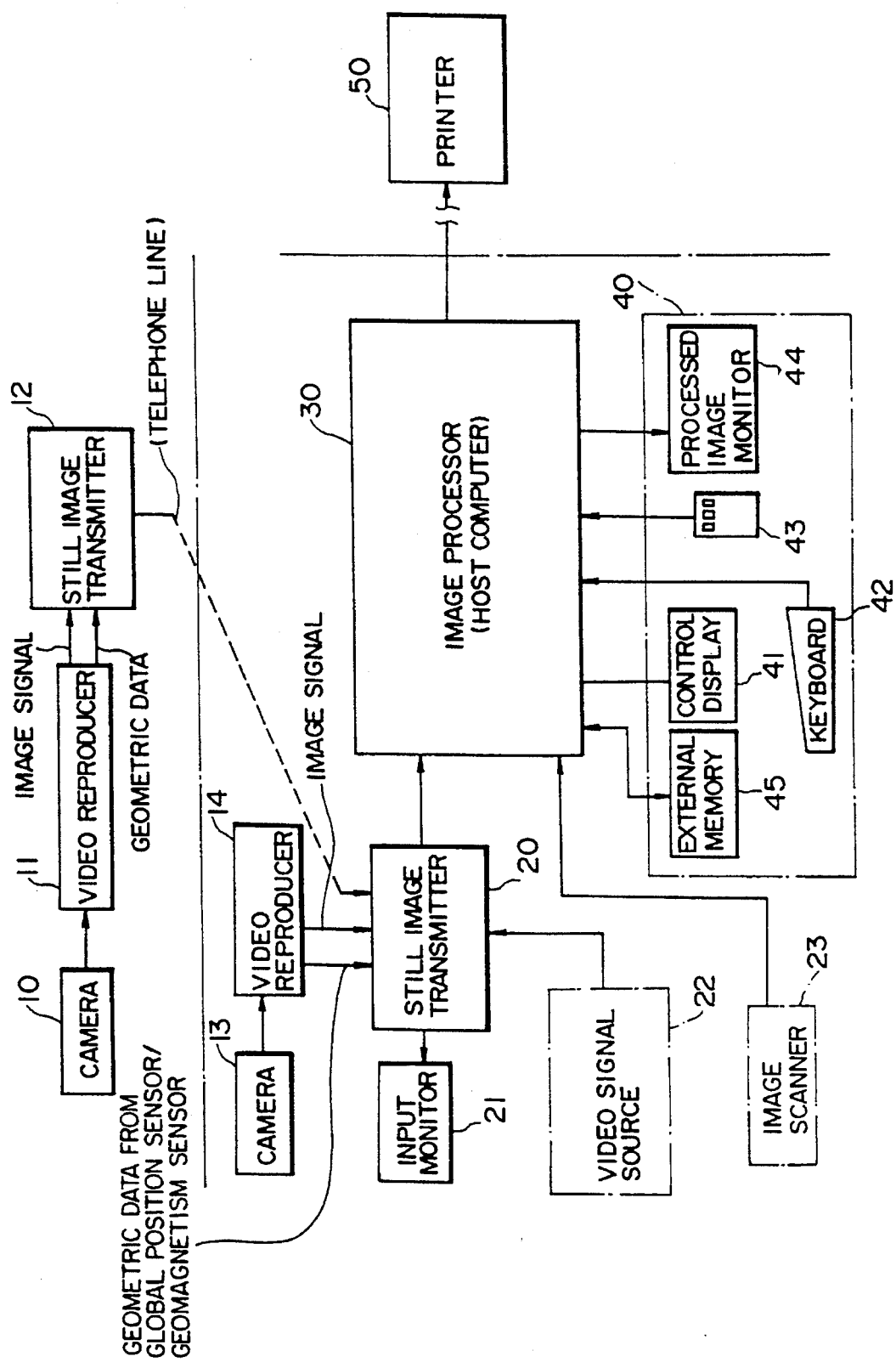
FIG. 1 is a block diagram of an image processing system where an embodiment of the present invention is employed.

FIG. 1 is a block diagram of an image processing system employing the image transforming apparatus of the present invention, wherein a photographed image signal or an image signal photographed at a remote site and transmitted therefrom is processed as a picture to be listed in a catalog or the like. First an explanation will be given below with regard to such image processing system.

FIG. 1 shows a photographing device 10 such as a television camera or an electronic still camera; a video reproducer (television monitor) 11 used at a remote site for reproducing a video signal outputted from the camera 10; and a still image transmitter 12 capable of transmitting, via a telephone line or a communication satellite, a desired image (color video signal corresponding to one frame) out of the video signal obtained from the camera 10.

Denoted by 13 and 14 are a camera and a television monitor which are similar respectively to the aforementioned camera 10 and television monitor 11 and are disposed in the vicinities of a still image transmitter 20 of the image processing system in such a manner as to be capable of supplying an image signal directly to the still image transmitter 20 without the necessity of any telephone line or the like. It is a matter of course that the television monitor 11 may be carried and disposed in the vicinity of the still image transmitter 20 to supply an image signal directly to the transmitter 20.

It is preferred that the cameras 10, 13 and the television monitors 11, 14 be equipped with means capable of recording and reproducing a video signal, a focal length and a photographing azimuth (hereinafter referred to as geometric data). Particularly with respect to the azimuth, such recording means needs to have a function of recording the relative angle to the subject being photographed.

Each of the cameras 10, 13 is equipped with a computing circuit which is capable of producing and recording the geometric data simultaneously with an operation of recording the image signal on a recording medium such as a floppy disk. The computing circuit detects and calculates the zooming and focusing amounts with regard to the view angle and the focal length, and an azimuth sensor is provided for calculating the azimuth (and the three-dimensional position).

The azimuth sensor may be constituted by the application of, for example, a global positioning system (GPS) which detects the position and the azimuth in accordance with radio waves transmitted from an artificial satellite, and a geomagnetism sensor may also be employed for detecting the azimuth alone. In detecting the three-dimensional position by the GPS, the precision error in the present technical stage ranges from 10 to 20 meters. Therefore, if a higher precision is required, it is preferred to employ an ultrasonic sensor which calculates the three-dimensional position and the azimuth by detecting ultrasonic waves from at least three wave sources, or another sensor which is furnished with a wave source utilizing the geomagnetism at a photographing site and calculates the three-dimensional position and the azimuth from the current generated in a coil having directivity in three directions.

When the geometric data is obtained by such means in the photographing mode, the video reproducers (television monitors) 11, 14 supply the geometric data together with the image signal to the still image transmitters 12, 20.

The still image transmitter 20 receives the image either via the still image transmitter 12 or directly from the video reproducer 14, and is capable of displaying the received image on a monitor 21. The still image signal (video signal corresponding to one frame and composed of Y/C signal, RGB signal or composite signal) supplied to the still image transmitter 20 is inputted either automatically or manually to an image processor 30 in the embodiment of the present invention.

In case the geometric data recorded in the photographing mode is supplied to the still image transmitter 20 together with the image signal, it follows that the geometric data is also inputted to the image processor 30 in conformity with the image signal.

However, if the cameras 10, 13 and the video reproducers 11, 14 are not equipped with the aforementioned sensor means or computer means and none of the geometric data is supplied to the still image transmitter 20 in conformity with the image signal, then the geometric data may be inputted by the use of a console 40 as will be described later.

Denoted by 22 is a video output apparatus such as a video disk unit, a VTR or a TV receiver which serves as a video signal source. The output video signal from such video source 22 (VTR, TV receiver, etc.) can also be supplied to the image processor 30 either directly or via the still image transmitter 20.

Reference numeral 23 denotes an image scanner capable of reading a film or a photograph to produce image data and supplying the same to the image processor 30. If the geometric data is included by a predetermined method in the image to be read, it follows that the geometric data can also be supplied to the image processor 30 simultaneously with the image.

As will be described later, the image processor 30 functions as a host computer in the entire system to perform various operations of storing the image signal supplied thereto, processing the image signal, and outputting the processed image signal to a printer.

Denoted by 40 is a console comprising a control display 41, a keyboard 42, a mouse 43, a processed image monitor 44, and an external memory 45. The operator can control various operations of the image processor 30 via such console 40. If none of the geometric data is automatically inputted to the image processor 30 together with the image signal as in the case where the photographing has been performed by the use of a camera and a video reproducer which are not capable of calculating and outputting the geometric data, the view angle is calculated from the focal length data recorded by the photographer, and is supplied from the console 40 to the image processor 30 together with the angle data relative to the photographed subject. Meanwhile the geometric data inputted automatically or manually from the console 40 is correctable later with respect to its value by manipulation of the console 40.

Denoted by 50 is a printer which prints the input image data processed by the image processor 30 and converted to printable color signals of cyan (C), magenta (M), yellow (Y) and black (K) for example.

In the constitution of the entire system mentioned above, the image formed by photographing a sample article is supplied to the image processor 30 via the still image transmitters 12, 20 and, after being processed through predetermined steps in the image processor 30, the printable image data is supplied to the printer 50, whereby the above constitution is rendered effectively utilizable as an editing system in a printing or publishing company.

Figure 2:
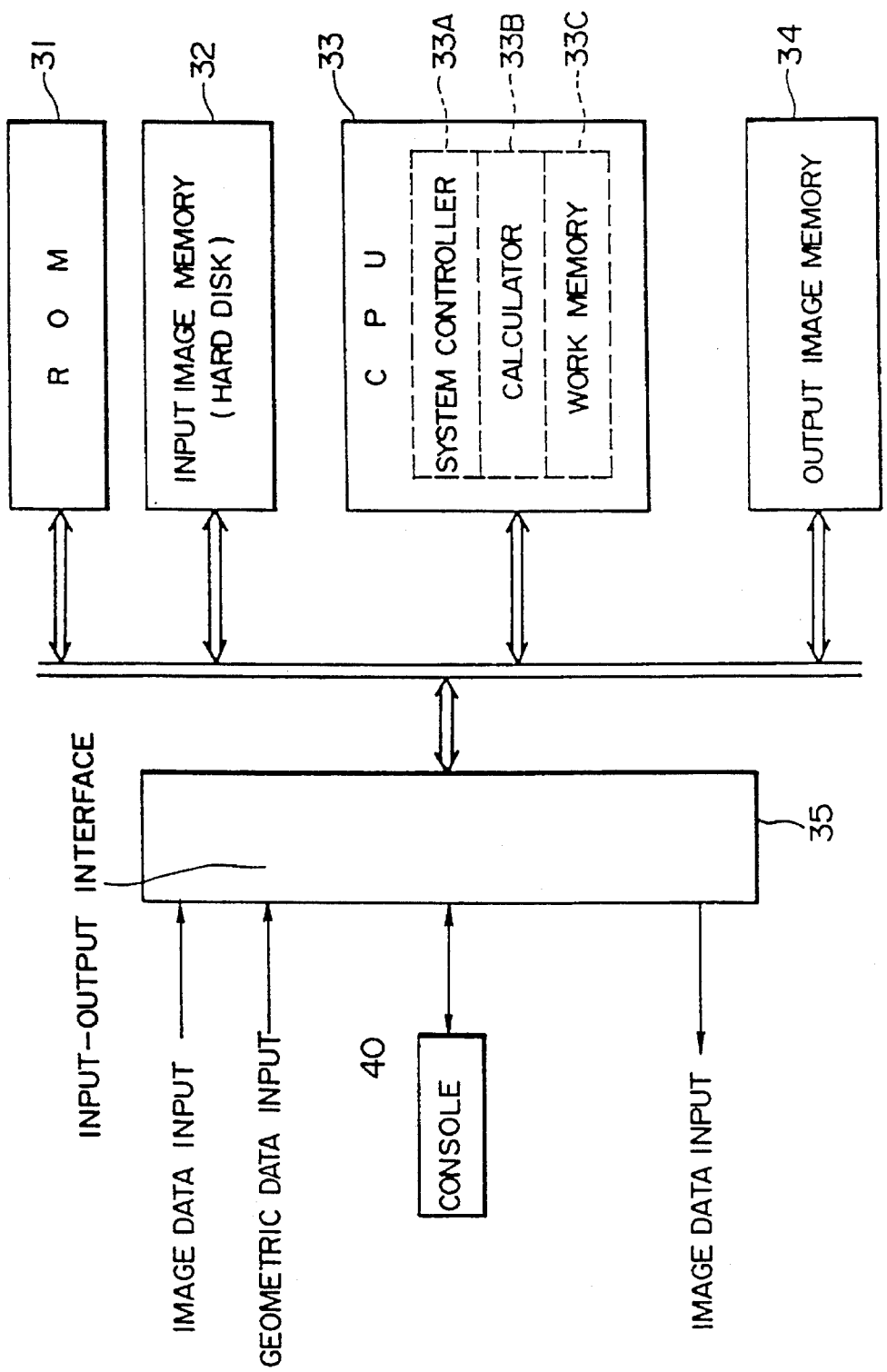
FIG. 2 is a block diagram of an image transforming apparatus embodying the present invention.

The image processor 30 included in the image processing system of FIG. 1 is so constituted as shown in FIG. 2.

The image processor 30 comprises a program ROM 31 where control programs are stored; an input image memory (e.g. hard disk) 32 for sequentially storing the image data inputted from an image source such as the still image transmitter 20; a CPU (central processing unit) 33; an output image memory 34 for storing the output image signal converted to cyan (C), magenta (M), yellow (Y) and black (K) color signals; and an input–output interface 35 for inputting and outputting the image data while transferring the signals to and from the console 40.

The CPU 33 comprises a system controller 33A for controlling the operation of each component circuit in accordance with the program, a calculator 33B for executing various calculations, and a work memory (main memory) 33C.

Figure 3:
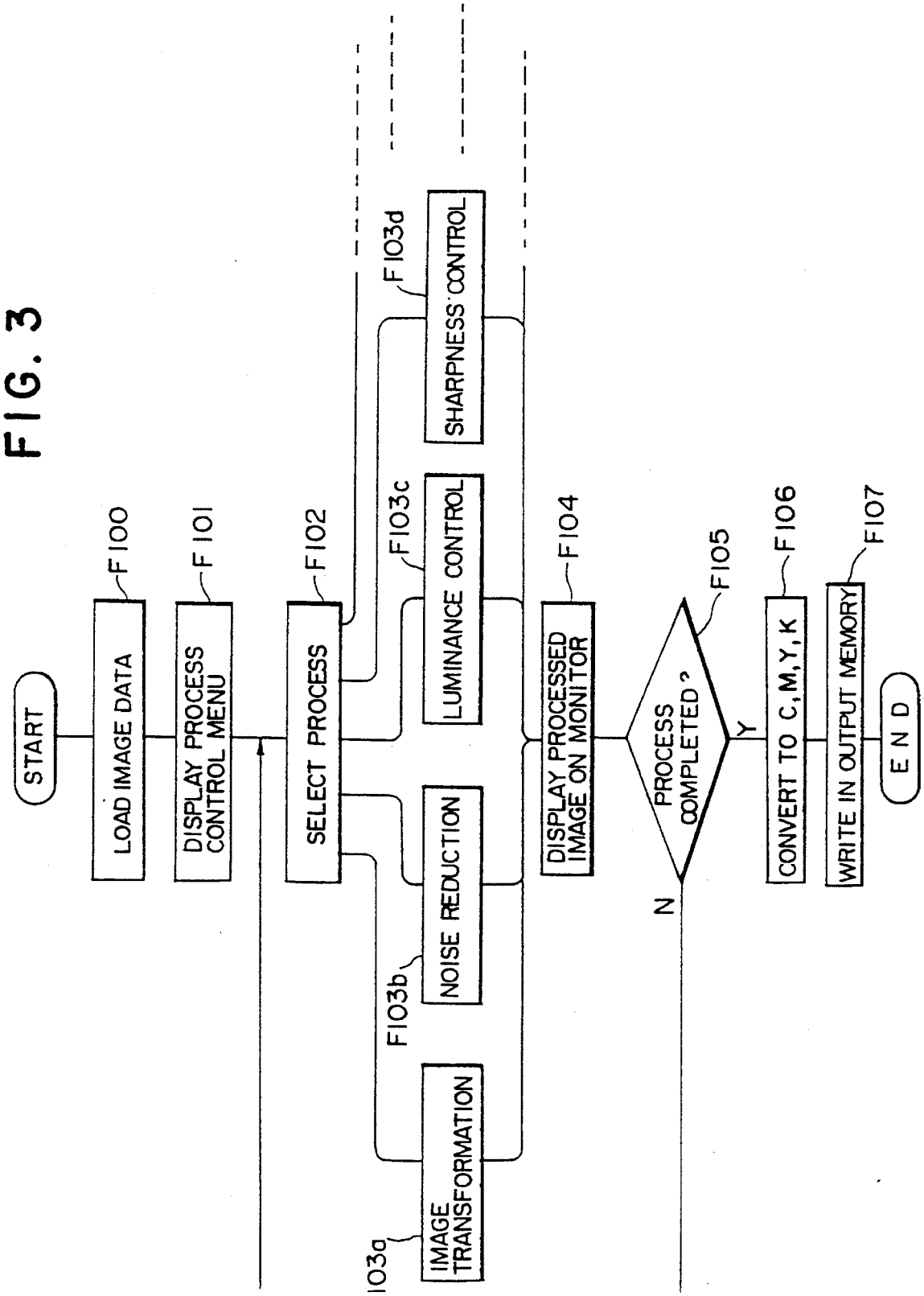
FIG. 3 is a flow chart showing the procedure of an exemplary operation performed in the image transforming apparatus of the present invention.

The still image signal inputted to the image processor 30 and the geometric data concomitant therewith are stored automatically in the input image memory 32. Subsequently the image data thus stored is read out, when required, from the input image memory 32 by the CPU 33, and then an image processing routine shown in a flow chart of FIG. 3 is executed.

In this image processing routine, first the image data to be processed is read out from the input image memory 32 and is loaded in the work memory 33C of the CPU 33 (step F100), and a control picture indicative of the process contents is displayed in the form of a menu on the control display unit 41 incorporated in the console 40 (step F101).

The process content is determined when any desired further to be executed is selected by the operator and is inputted by manipulation of the keyboard 42 or the mouse 43 (step F102). Thus, the desired process selected out of image transformation, noise reduction, chroma control and so forth is executed at steps F103a, F103b, F103c, etc.

The image transformation at step F103a includes dimensional enlargement or reduction of the input original image, change of the center position, rotation, and change of the image size. Although the steps F103a, F103b and so forth are shown in parallel in this flow chart, the steps may be so arranged as to be executed sequentially in a predetermined order.

The image signal processed at step F103 is supplied to the monitor 44 and is displayed thereon so that the operator can confirm the process (step F104). In case a further process is to be executed, such process is selected through manipulation by the operator (return from step F105 to step F102).

Upon completion of the entire selected image processing steps, the image signal (composed of Y/C signal) is converted to printable C, M, Y, K color signals (step F106), which are then stored as output data in the output image memory 34 (step F107). The signals thus stored are outputted to the printer 50 either automatically or in response to manipulation of the console 40 when required, so that the 4-color (C, M, Y, K) image signals are printed to form a color picture.

Although color image signals are outputted in this embodiment, it may be so modified as to output a monochrome image signal with omission of the step F106.

Tilting Process

The image processing system of FIG. 1 is equipped with the image processor 30 to execute the routine mentioned above, so that the desired picture can be printed on the basis of the image data (Y/C) outputted from the image source. In the image processor 30 of this embodiment, the image transformation at step F103a includes geometric transformation of the image signal which corresponds to the tilting process in a film camera. This operation is performed on the basis of the geometric data obtained in the photographing mode and inputted together with the image signal or inputted from the console 40 as mentioned. Hereinafter such geometric transformation of the image signal will be described in detail.

Figure 4:
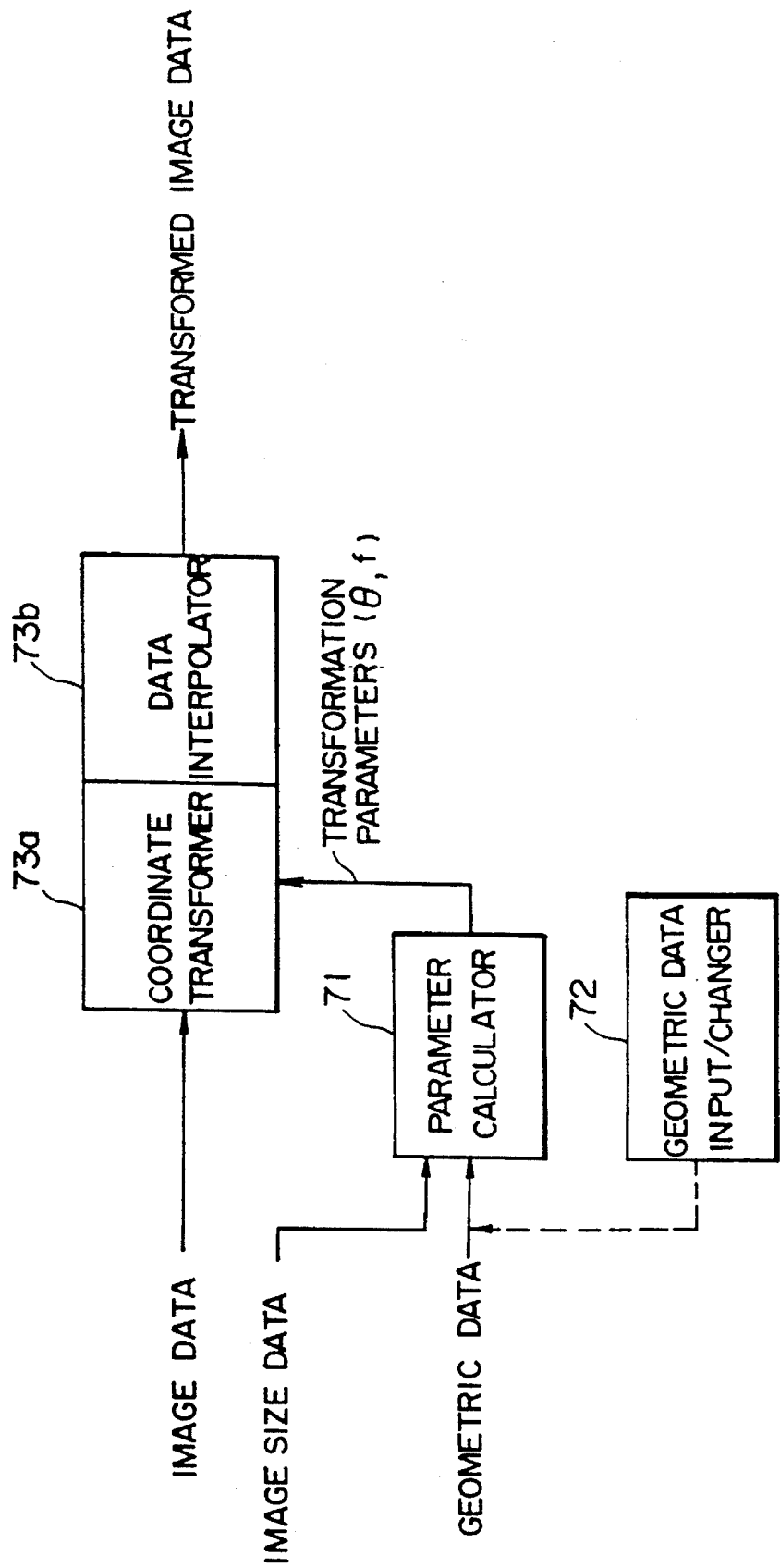
FIG. 4 is a block diagram of functions to execute geometric image transformation in the apparatus of the invention.

FIG. 4 is a block diagram of functions constituted as software to perform the geometric image transformation in the image processor 30 of the embodiment. In this diagram are shown a transformation parameter generator means 71, a geometric data input/changer means 72, a coordinate transformer means 73a, and a data interpolator means 73b.

The transformation parameter generator means 71 produces parameters $\theta$ (depression angle) and f (focal length), which are required for the processes in the coordinate transformer means 73a and the data interpolator means 73b, on the basis of the geometric data and the picture size data. First, the coordinates are transformed in accordance with the parameters $\theta$ and f in the coordinate transformer means 73a, and then the data interpolation is computed in the data interpolator means 73b.

Now a description will be given on the process of image transformation which is executed in the coordinate transformer means 73a and the data interpolator means 73b correspondingly to the tilting process.

Figure 13:
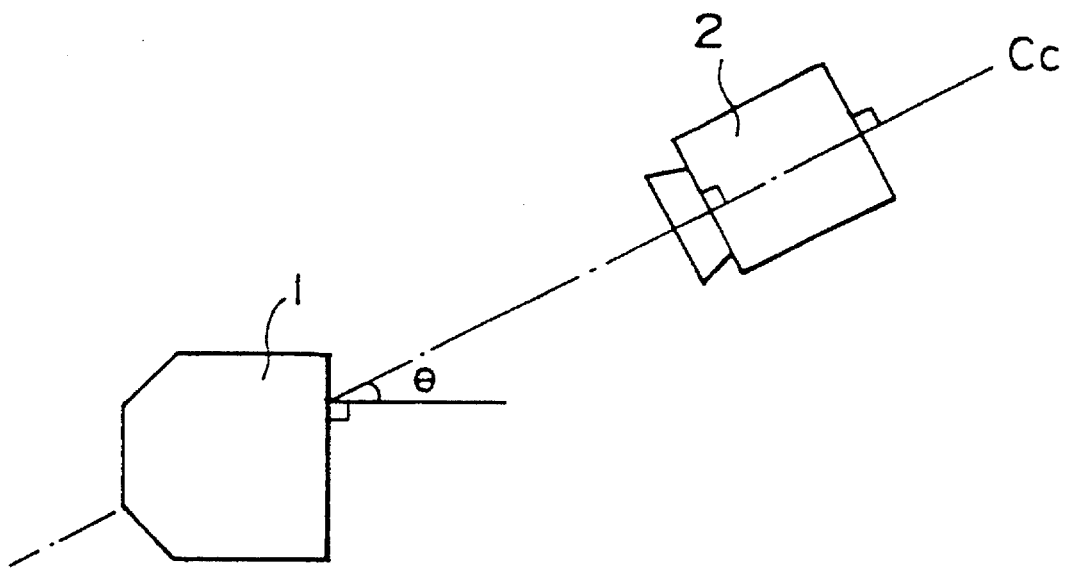
FIG. 13 illustrates a photographing operation.
Figure 14:
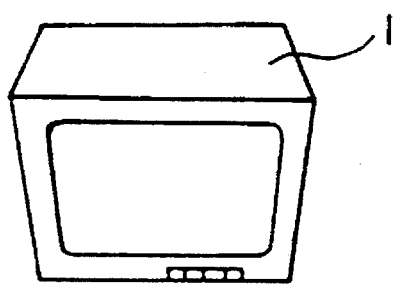
FIG. 14 illustrates an exemplary photographed image.
Figure 15:
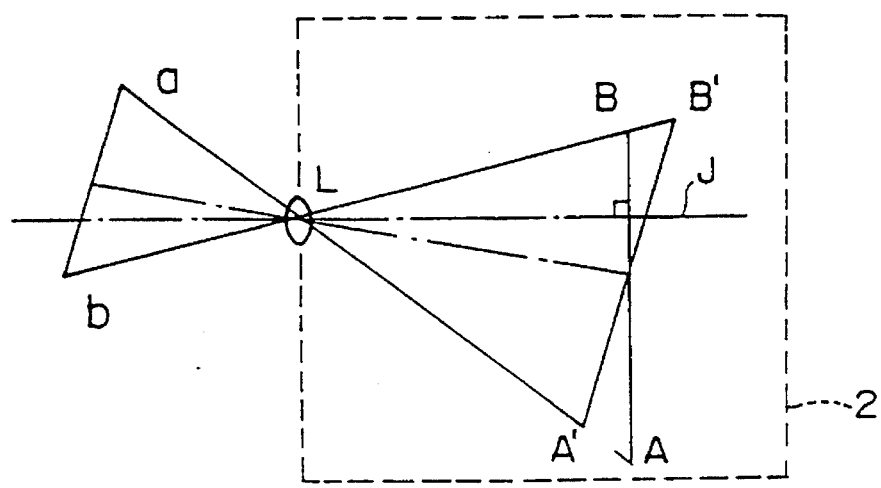
FIG. 15 is a schematic diagram showing how a tilting process is executed.
Figure 16:
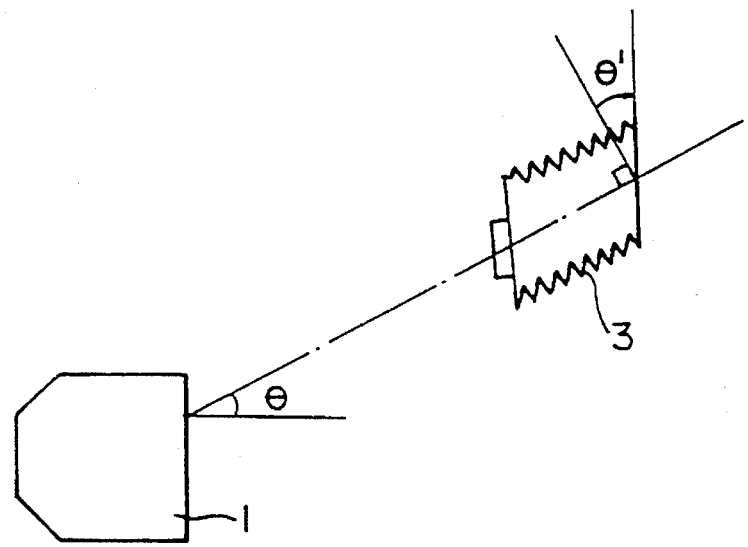
FIG. 16 illustrates how a photographing operation is performed with a tilting process.

Suppose here that the photographic setting is such as illustrated in FIG. 13. For the purpose of simplifying the illustration, it is assumed that the horizontal inclination angle of the center axis Cc of the camera is 0° to the front of the subject being photographed, but the depression angle θ is existent vertically as viewed from the camera 2.

Figure 5:
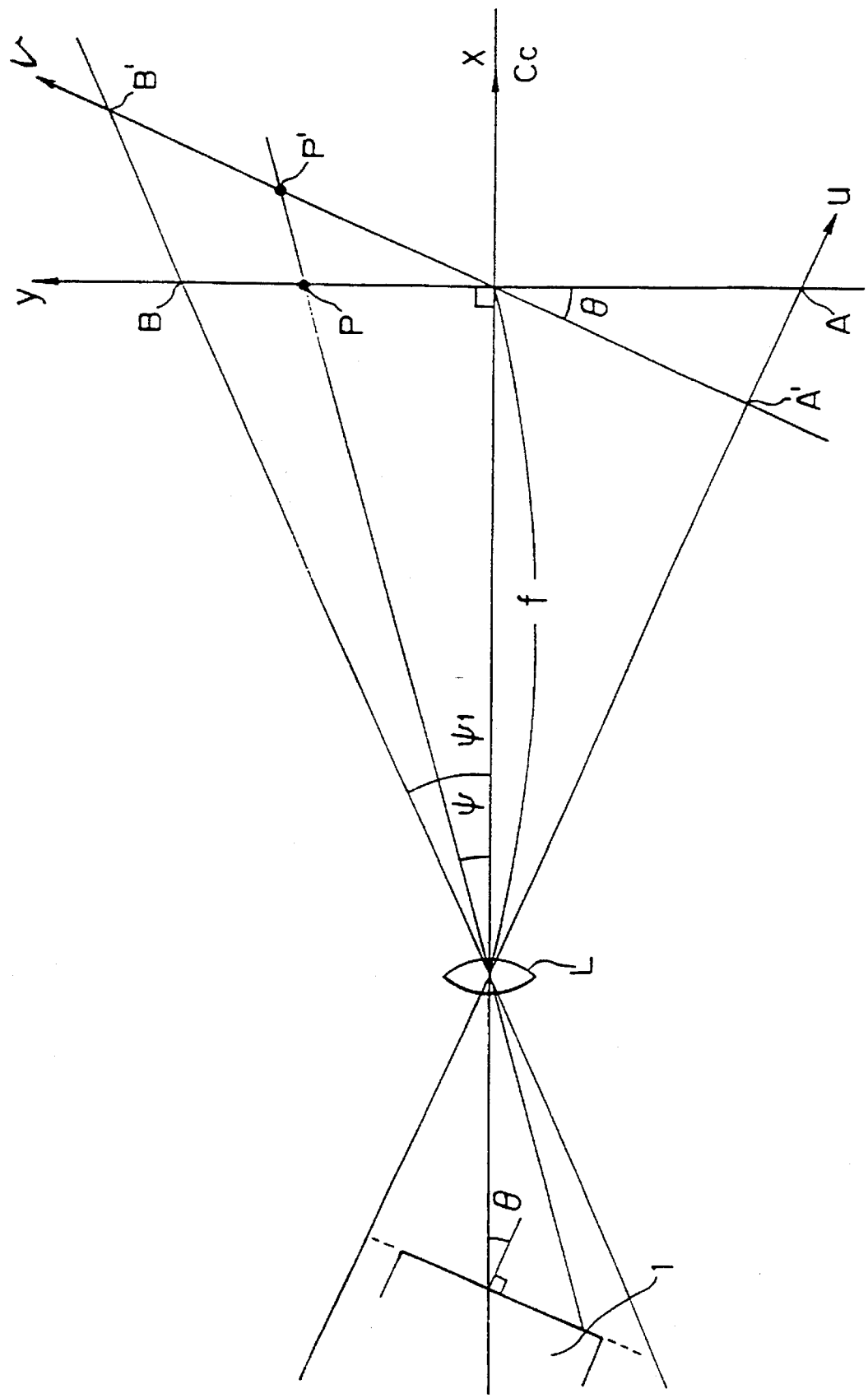
FIG. 5 graphically shows how the geometric image transformation is performed in the apparatus of the invention.

The tilting process for transforming the image-forming focal plane from (A–B) to (A'–B') as shown in FIG. 5 corresponds to a process for changing a position P on the x, y coordinates to another position P' on the u, v coordinates which are obtained with a rotation of the depression angle θ from the x, y coordinates. Therefore the coordinate transformation of P (x, y) to P' (u, v) is a projective transformation given by $$u = \frac{f \cdot x}{f - y\tan\theta} \quad (1)$$

$$v = \frac{f \cdot y}{f\cos\theta - y\sin\theta}$$

Then, an image transformation is executed by using the following equation where u, v are expressed by x, y.

$$x = \frac{f \cdot u}{f + \sin\theta \cdot v} \quad (2)$$

$$y = \frac{f\cos\theta \cdot v}{f + \sin\theta \cdot v}$$

According to Eq. (2), the coordinate transformer means 73a sets the coordinates to be transformed and transforms the coordinates of each pixel in the image signal, i.e., calculates the value of the image signal (pixel data) at the new coordinates. Once the coordinate transformation is completed, the data interpolator means 73b executes a predetermined interpolation of the data to thereby produce an image on the transformed coordinates.

Figure 17:
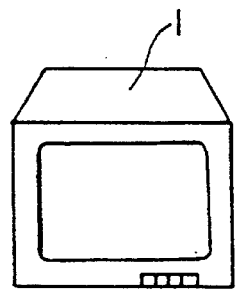
FIG. 17 illustrates an image photographed with a tilting process.

Due to the process mentioned above, it becomes possible to obtain a desired image by geometric transformation similar to the known case of optically executing the tilting process as illustrated in FIG. 17, hence realizing the efficacy of the ordinary optical tilting process by the image transformation.

In the coordinate transformer means 73a and the data interpolator means 73b described above, the parameters θ and f used for geometric transformation of the image are supplied from the parameter generator means 71. The transformation parameters θ and f are outputted from the parameter generator means 71 on the basis of the geometric data and the focal-plane size data inputted thereto, and various calculations are executed in compliance with requirements. For example, even when the focal length f is not recorded as the geometric data, it can be calculated with facility if the view angle $\psi_1$ is recorded as the geometric data, since the focal-plane size is fixed depending on the kind of the camera.

The value of the geometric data can be inputted or changed, when necessary, by operating the geometric data input/changer means 72 through manipulation of the console 40.

In case the value of either the depression angle θ or the focal length f is unknown, the calculation in the parameter generator means 71 is executed in the following procedure.

Figure 6:
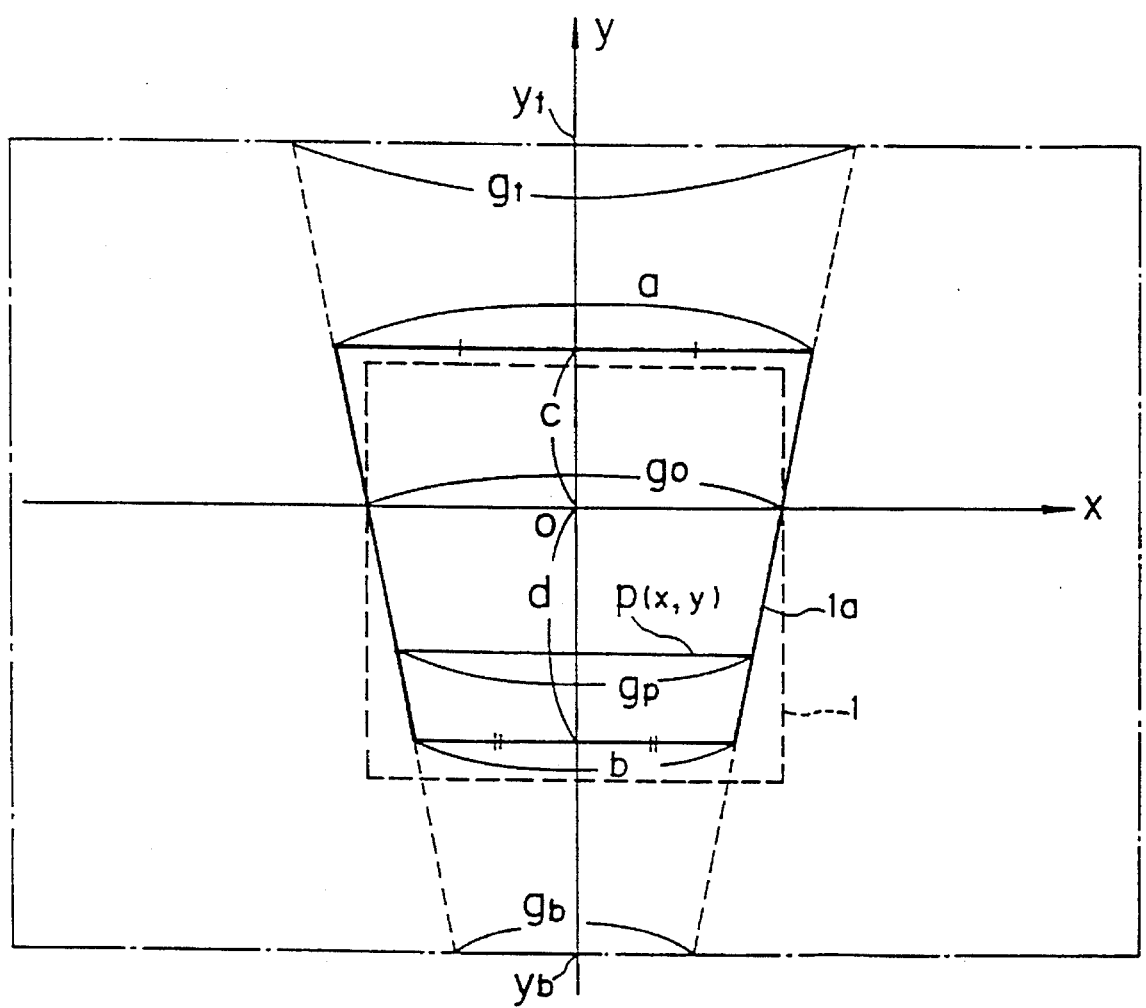
FIG. 6 graphically shows how parameters are calculated in the apparatus of the invention.

Suppose here that, as shown in FIG. 6, an actually rectangular subject 1 (represented by a broken line) is photographed as a trapezoid 1a (represented by a solid line) having an upper side a, a lower side b and a height c+d.

Since the values of the sides a, b, c, d can be calculated from the image signal data inputted as a photographed image, the following three equations are obtained with regard to the width $g_o$ at y=0 (on the x-axis) of the y-axis which is the center of rotation, the width $g_t$ determined when the vertical lines of the trapezoid 1a are extended to the upper end of the image portion where $y=y_t$, and the width $g_b$ determined when the vertical lines of the trapezoid 1a are extended down to the lower end of the image portion where $y=y_b$.

$$g_o = \frac{bc + ad}{c + d} \quad (3)$$

$$g_t = \frac{bc + ad + (a-b)y_t}{c + d} \quad (4)$$

$$g_b = \frac{bc + ad + (a-b)y_b}{c + d} \quad (5)$$

In the above equations, R is set as $R=g_o/g_b$ when $g_b \leq g_o$, or as $R=g_o/g_t$ when $g_b > g_o$, so that the depression angle θ can be calculated according to $$\theta = \sin^{-1}\left( \frac{R-1}{\sqrt{1 - 2R + (R^2/\cos^2\psi_1)}} \right) \quad (6)$$

Meanwhile, the view angle $\psi_1$ is given by Eq. (7) or (8) as follows.

$$\psi_1 = \tan^{-1}\left( \frac{y_b}{f} \right) \quad (7)$$

$$\psi_1 = \tan^{-1}\left( \frac{y_t}{f} \right) \quad (8)$$

The focal length f can be calculated according to $$f = \frac{y \cdot R}{R - 1} \tan\theta \quad (9)$$

where y is the size of the image-forming focal plane.

The processes subsequent to step F104 in the flow chart of FIG. 3 are executed with regard to the image signal obtained by geometric transformation of the image corresponding to the tilting process in the coordinate transformer means 73a and the data interpolator means 73b by the use of the parameters θ and f supplied from the parameter generator means 71 as described above, and the processes are displayed on the image monitor 44 in the console 40. Furthermore, if necessary, the image signal is converted to C, M, Y, K color signals after a predetermined process and then is outputted to the printer 50, whereby the image signal can be printed as a picture to be listed in a catalog or the like.

In the image processor 30 of this embodiment, the geometric data is changeable by the function of the geometric data input/changer means 72, so that it becomes possible to perform a variety of geometric transformations such as to achieve an intentionally emphasized portion of the image in addition to the mere image transformation corresponding to the tilting process.

Although in the above embodiment the coordinate transformation of the input image is executed with rotations of two-dimensional coordinate axes for the convenience of the explanation, it is practically possible to perform rotations of three-dimensional coordinate axes as well.

Depth-effect Emphasizing Process

Hereinafter a description will be given on a process for controlling and emphasizing the depth effect of the image used as one of image transformations in the image processor 30 of this embodiment.

This image transformation is a process for forming an altered image equivalent to the image obtained by selectively changing the viewing position and the focal length of the camera 10 or 13 to the subject being photographed. This process will be referred to as "depth-effect emphasizing process" in the following description. Such process for controlling and emphasizing the depth effect can be executed independently of, or in combination with, the image transformation corresponding to the aforesaid "tilting process" in the image processor of this embodiment.

The above process is executed at step F103a when the aforementioned routine of FIG. 3 is executed by the CPU 33 for the image inputted to the image transforming apparatus 30 and stored in the input image memory 32.

In the tilting process described, geometric data (parameters for image transformation) inclusive of the view angle, focal length and azimuth in the photographing mode are inputted to the image transforming apparatus 30 simultaneously with the image signal. As for the depth-effect emphasizing process, a description will be given with reference to an assumed exemplary case where merely the image signal alone is inputted, and the required values of the parameters and so forth at a two-dimensional projection in the photographing mode are calculated from the data relative to the sides of the image, and the image transformation is executed with the required parameters inputted by the operator.

If the distortions of the lenses in the cameras 10, 13 are ideally minimal to be therefore ignorable, the image obtained by each of the cameras 10, 13 can be regarded as a result of projective transformation of a subject from a three-dimensional space to a two-dimensional space.

Such projective transformation is definitely determined by setting some parameters. Meanwhile, it is also possible, to the contrary, to control and emphasize the appearance of the input image, i.e. the depth effect thereof, by calculating such parameters from the image obtained, then changing the predetermined parameters inclusive of the view position coordinates and the focal length from the former values (in the photographing mode) to transform the image.

Now a description will be given on the projective transformation and the operation of calculating the parameters.

Figure 7:
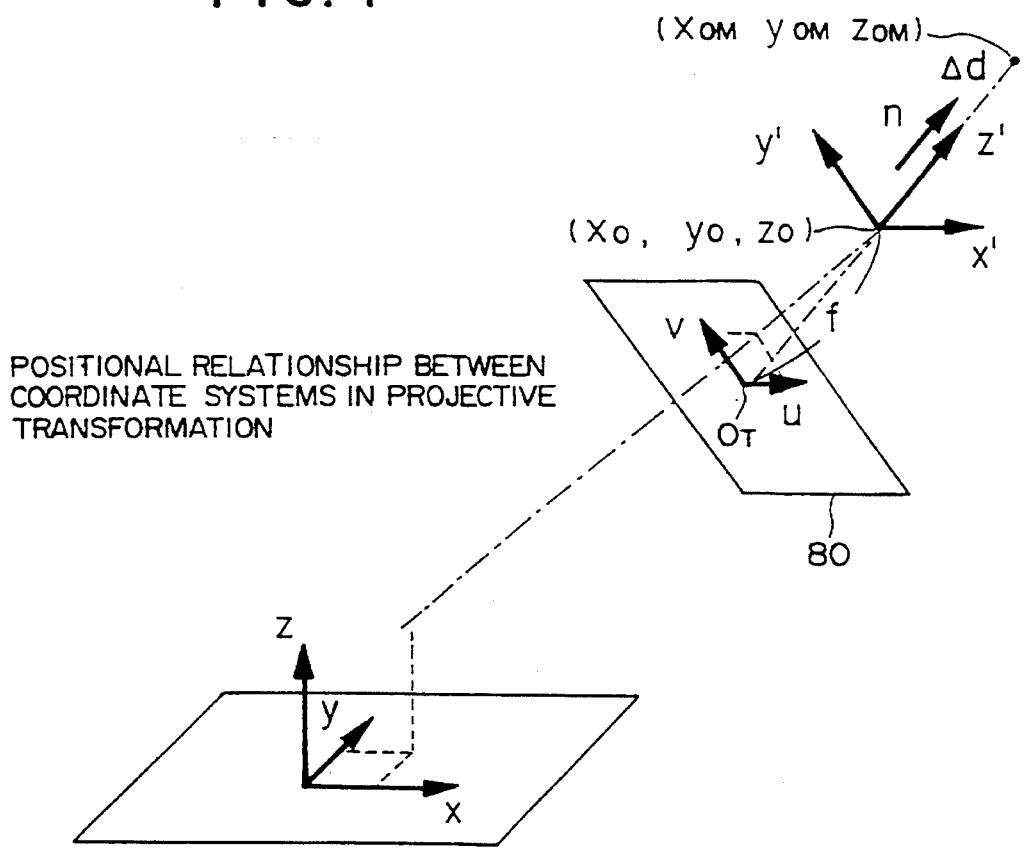
FIG. 7 illustrates a projective transformation executed in the apparatus of the invention.

First a three-dimensional coordinate system (x–y–z system) is prepared as shown in FIG. 7. Such coordinate system is rotated around the z-axis by an angle $\alpha$, then is further rotated around the x-axis by an angle $\beta$, and the origin is shifted in parallel with the viewing position $(x_o, y_o, z_o)$ to obtain an altered x'–y'–z' coordinate system as shown in FIG. 7. In the two x–y–z and x'–y'–z' coordinate systems, the position coordinates are coupled to each other by Eq. (10) below.

$$\begin{bmatrix} x' \\ y' \\ z' \end{bmatrix} = \begin{bmatrix} 1 & 0 & 0 \\ 0 & \cos\beta & \sin\beta \\ 0 & -\sin\beta & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix} \begin{bmatrix} x-x_0 \\ y-y_0 \\ z-z_0 \end{bmatrix} \quad (10)$$

$$= \begin{bmatrix} (x-x_0)\cos\alpha + (y-y_0)\sin\alpha \\ -(x-x_0)\sin\alpha\cos\beta + (y-y_0)\cos\alpha\cos\beta + (z-z_0)\sin\beta \\ (x-x_0)\sin\alpha\sin\beta - (y-y_0)\cos\alpha\sin\beta + (z-z_0)\cos\beta \end{bmatrix}$$

When the z'-axis is parallel with the direction of the visual line, the projection plane with the focal length f, i.e. the projective transformation to the uv plane 80, is given by $$u = -f \frac{x'}{z'} \quad (11)$$

$$v = -f \frac{y'}{z'}$$

In the above, the conditions are such that the origin $O_T$ of the uv plane 80 is the point where a straight line, which is directionally the same as the visual line and passes through the viewing position $(x_o, y_o, z_o)$, intersects the uv plane 80, and a directional coincidence is attained between the x'-axis and the u-axis, and also between the y'-axis and the v-axis.

Consequently any point in the three-dimensional space can be transferred to a point on the uv plane 80 which is the projection plane.

As for a shift of the viewing position coordinates $(x_o, y_o, z_o)$, a calculation is executed to obtain the coordinates $(x_{OM}, y_{OM}, z_{OM})$ of a point to which the former viewing position coordinates $(x_o, y_o, z_o)$ are shifted by a distance $\Delta d$ in the direction of a visual line vector n. It is predetermined here that, when $\Delta d > 0$, the viewing position is shifted away from the subject.

It is found from FIG. 7 that the visual line vector n is expressed as $$n = (\sin\alpha\sin\beta, -\cos\alpha\sin\beta, \cos\beta) \quad (12)$$

Therefore, $$\begin{bmatrix} x_{OM} \\ y_{OM} \\ z_{OM} \end{bmatrix} = \begin{bmatrix} x_o + \Delta d \sin\alpha\sin\beta \\ y_o - \Delta d \cos\alpha\sin\beta \\ z_o + \Delta d \cos\beta \end{bmatrix} \quad (13)$$

For calculating the viewing position coordinates $(x_o, y_o, z_o)$ and the parameters such as rotation angles $(\alpha, \beta)$ from the data of the straight line on the uv plane 80, it is necessary to previously know how a straight line I in the three-dimensional space having components Ix, Iy and Iz is formed into an image on the uv plane 80. Such calculations can be executed according to Eqs. (10) and (11) mentioned above.

With regard to a straight line Ix parallel with the x-axis where y and z are both fixed, Eq. (14) is derived from Eq. (10) when $y - y_o = Y$ and $z - z_o = Z$ (fixed).

$$\begin{aligned} x' &= \{(x-x_0)\sin\alpha\sin\beta - Y\cos\alpha\sin\beta + \\ &\quad Z\cos\beta\}\left(\frac{\cos\alpha}{\sin\alpha\cos\beta}\right) + Y\frac{\cos^2\alpha}{\sin\alpha} - \\ &\quad Z\frac{\cos\alpha\cos\beta}{\sin\alpha\sin\beta} + Y\sin\alpha \\ &= z'\frac{\cos\alpha}{\sin\alpha\sin\beta} + \frac{Y}{\sin\alpha} - Z\frac{\cos\alpha\cos\beta}{\sin\alpha\sin\beta} \\ y' &= \{(x-x_0)\sin\alpha\sin\beta - Y\cos\alpha\sin\beta + \\ &\quad Z\cos\beta\}\left(\frac{-\cos\beta}{\sin\beta}\right) - Y\cos\alpha\cos\beta + \\ &\quad Z\frac{\cos^2\beta}{\sin\beta} + Y\cos\alpha\cos\beta + Z\sin\beta \\ &= -z'\frac{\cos\beta}{\sin\beta} + \frac{Z}{\sin\beta} \end{aligned} \quad (14)$$

Therefore, from Eq. (11), u and v are expressed as $$u = -f\frac{x'}{z'} = -f\frac{\cos\alpha}{\sin\alpha\sin\beta} - \frac{f}{z'}\left(-Z\frac{\cos\alpha\cos\beta}{\sin\alpha\sin\beta} + \frac{Y}{\sin\alpha}\right) \quad (15)$$

-continued
$$v = -f \frac{y'}{z'} = \frac{f}{\tan\beta} - \frac{fZ}{z'\sin\beta}$$

Eliminating z' from the above, $$\frac{\sin\beta}{Z}\left(v - \frac{f}{\tan\beta}\right) = \frac{\sin\alpha\sin\beta}{-Z\cos\alpha\cos\beta + Y\sin\beta}\left(u + f\frac{\cos\alpha}{\sin\alpha\sin\beta}\right) \quad (16)$$

Consequently, $$v - \frac{f}{\tan\beta} = \frac{Z\sin\alpha}{Y\sin\beta - Z\cos\alpha\cos\beta}\left(u + f\frac{\cos\alpha}{\sin\alpha\sin\beta}\right) \quad (17)$$

or $$v = \frac{Z\sin\alpha}{Y\sin\beta - Z\cos\alpha\cos\beta} u + f\frac{Y\cos\beta + Z\cos\alpha\sin\beta}{Y\sin\beta - Z\cos\alpha\cos\beta} \quad (18)$$

It is found therefrom that a straight line Ix parallel with the x-axis passes through a fixed point expressed as $$\left(-f\frac{\cos\alpha}{\sin\alpha\sin\beta}, \frac{f}{\tan\beta}\right) \quad (19)$$

Meanwhile, when x and z are both fixed, Eq. (20) or (21) is obtained by a calculation where $x-x_o=X$ and $z-z_o=Z$ (fixed) similarly to the foregoing case of the straight line Ix expressed by Eqs. (14) to (16) above.

$$v - \frac{f}{\tan\beta} = \frac{Z\cos\alpha}{X\sin\beta + Z\sin\alpha\cos\beta}\left(u - f\frac{\sin\alpha}{\cos\alpha\sin\beta}\right) \quad (20)$$

$$v = \frac{Z\cos\alpha}{X\sin\beta + Z\sin\alpha\cos\beta} u + f\frac{X\cos\beta - Z\sin\alpha\sin\beta}{X\sin\beta + Z\sin\alpha\cos\beta} \quad (21)$$

Consequently it is found therefrom that a straight line Iy parallel with the y-axis passes through a fixed point expressed as $$\left(f\frac{\sin\alpha}{\cos\alpha\sin\beta}, \frac{f}{\tan\beta}\right) \quad (22)$$

Further with regard to a straight line Iz parallel with the z-axis where $x-x_o=X$ and $y-y_o=Z$ (fixed), Eq. (23) can be obtained by executing a calculation under the conditions of $x-x_o=X$ and $y-y_o=Z$ (fixed) similar to the aforementioned case of the straight line Ix given by Eqs. (14) to (16).

$$v = -\frac{1}{\cos\beta}\frac{X\sin\alpha - Y\cos\alpha}{X\cos\alpha + Y\sin\alpha} u - f\tan\beta \quad (23)$$

It is found therefrom that the straight line Iz parallel with the z-axis passes through a fixed point expressed as $$(0, -f\tan\beta) \quad (24)$$

Thus, it is understood from the above results that each of the straight lines parallel with the axis in the three-dimensional space has such characteristic as to pass through a certain fixed point when projected onto the uv plane 80.

On the basis of the information thus acquired, there are calculated the projective transformation parameters such as the viewing position coordinates $(x_o, y_o, z_o)$, the rotation angles $(\alpha, \beta)$, the focal length f and the subject size from the image projected onto the uv plane 80 (i.e. the image inputted to the image transforming apparatus 30).

Figure 8:
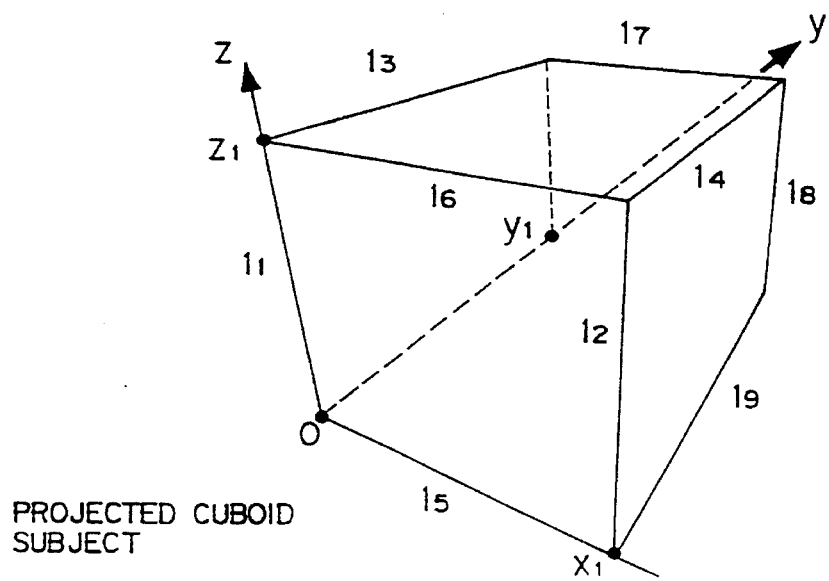
FIG. 8 is an explanatory diagram for a parameter calculation method adopted in the invention.

In this example, the subject is assumed to be a cuboid, and its individual sides are denoted by $1_1$ to $1_9$ as illustrated in FIG. 8. Further its vertex positions are represented by x, y, z coordinates. It is then assumed that, on the image-forming focal plane, the equations of the straight lines corresponding to the straight sides $1_1$ to $1_9$ of the cuboid subject are known. The slope of each such side $1_1$ to $1_9$ can be denoted respectively by $a_1$ to $a_9$, and the y-component of each such side denoted respective by $b_1$ to $b_9$. Since the sides $1_3$ and $1_4$ of the cuboid subject are parallel with the y-axis three-dimensionally, the intersection of the straight lines $1_3$ and $1_4$ projected onto the image-forming focal plane is represented by the fixed-point coordinates given by Eq. (22). Similarly, the intersection of the straight lines $1_6$ and $1_7$ on the projection plane and parallel with the x-axis three-dimensionally is represented by the fixed-point coordinates given by Eq. (19).

Further the y-component $b_1$ of the straight line $1_1$ parallel with the z-axis is found to be $-f\tan\beta$ from Eq. (23).

Therefore the rotation angles $\alpha$, $\beta$ and the focal length f can be calculated from the above as follows.

$$\tan\alpha = \sqrt{-\frac{a_6 - a_7}{b_6 - b_7}\frac{b_3 - b_1}{a_3 - a_4}} \quad (25)$$

$$\tan\beta = \sqrt{-\frac{b_1(a_3 - a_4)}{a_3 b_4 - b_3 a_4}}$$

$$f = \sqrt{\frac{b_1(a_3 b_4 - b_3 a_4)}{a_3 - a_4}}$$

Subsequently the size of the cuboid subject and the viewing position coordinate $(x_o, y_o, z_o)$ can be calculated in the following procedure. However, merely the length ratio alone can be obtained from the projected image, and it is impossible to find the absolute length. Therefore the y-coordinate of the viewing position is applied as $y_o=-L$.

Since the inclination (=a) of the straight line $1z$ parallel with the z-axis is already known as mentioned, Eq. (26), derived from Eq. (23) as above is the following:

$$a = -\frac{1}{\cos\beta}\frac{X\sin\alpha - Y\cos\alpha}{X\cos\alpha + Y\sin\alpha} \quad (26)$$

Solving Eq. (26) with respect to X, $$X = -\frac{a\tan\alpha\cos\beta - 1}{a\cos\beta + \tan\beta} Y \quad (27)$$

As mentioned, $X=(x-x_o)$, $Y=(y-y_o)$ and $y_o=-L$. Therefore, the straight line $1_1$ (x=0, y=0) parallel with the z-axis is expressed as $$x_0 = \frac{a_1 \tan\alpha\cos\beta - 1}{a_1 \cos\beta + \tan\alpha} L \quad (28)$$

Similarly, using the straight line $1_2$ ($x=x_1$, y=0) parallel with the z-axis, $x_1$ is expressed as $$x_1 = x_o - \frac{a_2 \tan\alpha\cos\beta - 1}{a_2 \cos\beta + \tan\alpha} L \quad (29)$$

Furthermore the y-segment (=b) of the straight line $1x$ parallel with the x-axis is already known as described, so that Eq. (30) is derived from Eq. (18).

$$b = f\frac{Y\cos\beta + Z\cos\alpha\sin\beta}{Y\sin\beta - Z\cos\alpha\cos\beta} \quad (30)$$

Solving Eq. (30) with respect to Z, $$Z = \frac{1}{\cos\alpha}\frac{b\sin\beta - f\cos\beta}{b\cos\beta + f\sin\beta} Y \quad (31)$$

Here, $Z=(z-z_o)$ as mentioned above. Therefore, using the straight line $1_5$ (y=0, z=0) parallel with the x-axis, $z_o$ is expressed as $$z_0 = -\frac{1}{\cos\alpha}\frac{b_5\sin\beta - f\cos\beta}{b_5\cos\beta + f\sin\beta} L \quad (32)$$

Regarding the straight line $1_6$ (y=0, z=$z_1$) parallel with the x-axis, $z_1$ is expressed as $$z_1 = z_0 + \frac{1}{\cos\alpha} \frac{b_6\sin\beta - f\cos\beta}{b_6\cos\beta + f\sin\beta} L \qquad (33)$$

And finally $y_1$ is calculated according to Eq. (34) by solving Eq. (31) with respect to Y and using the straight line $1_7$ (y=$y_1$, z=$z_1$) parallel with the x-axis.

$$y_1 = \left( \frac{b_6\sin\beta - f\cos\beta}{b_7\sin\beta - f\cos\beta} \frac{b_7\cos\beta + f\sin\beta}{b_6\cos\beta + f\sin\beta} - 1 \right) L \qquad (34)$$

Thus, it is understood from the above that the parameters for the projective transformation can be calculated merely by inputting the distance L from each of the cameras 10, 13 to the subject (accurately the shortest distance from the camera to the plane including the front of the subject).

In other words, it becomes possible to calculate the viewing position coordinates ($x_o$, $y_o$, $z_o$), the rotation angles ($\alpha$, $\beta$), the focal length f and the subject size from the projected image.

Figure 9:
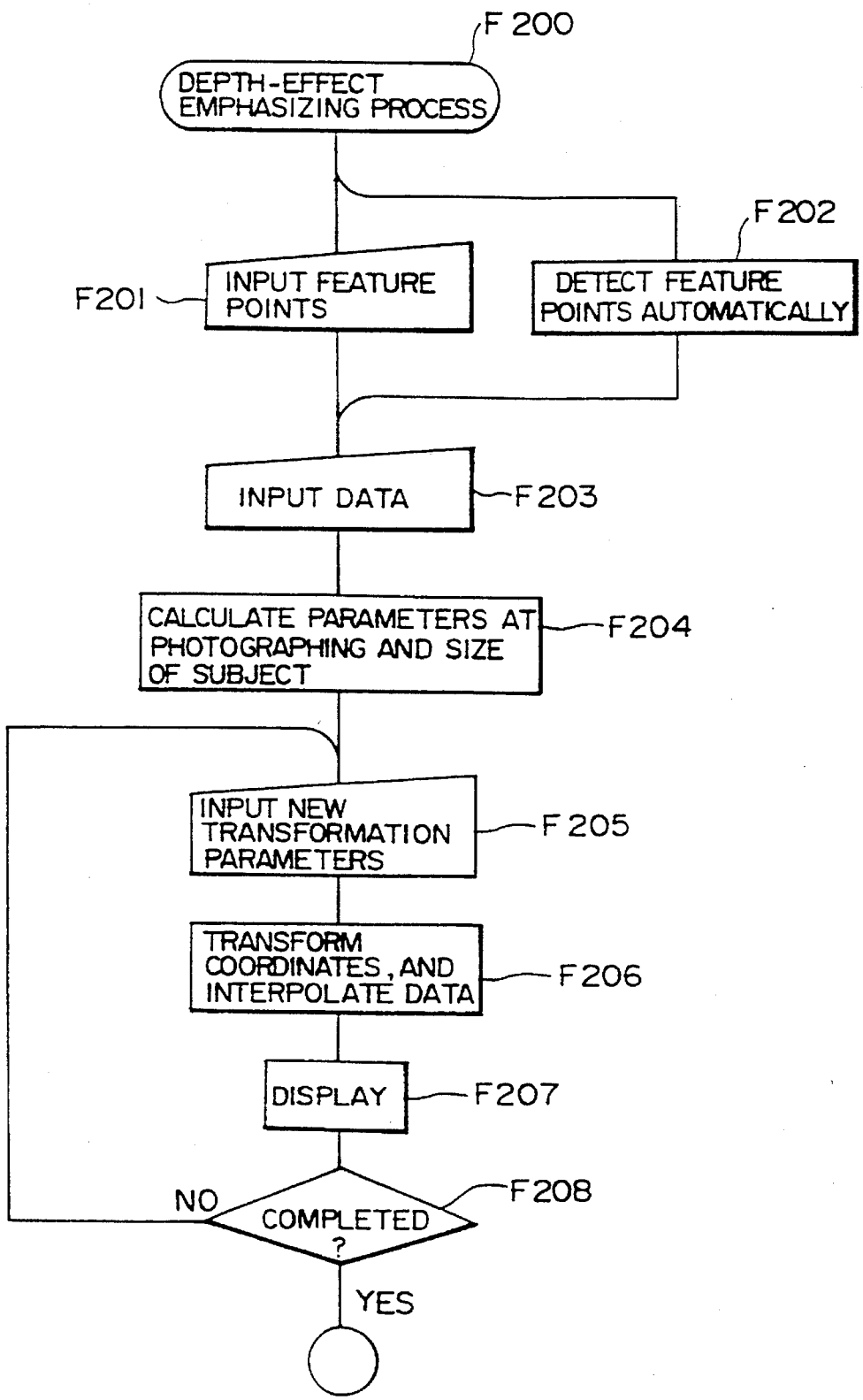
FIG. 9 is a flow chart showing the procedure of a depth-effect emphasizing process executed in the apparatus of the invention.

The depth-effect emphasizing process in this embodiment is executed through image transformation performed by calculating the parameters in the above procedure and further inputting the transformation parameters. The routine of such processing procedure is shown in FIG. 9. Steps F200 to F208 are executed correspondingly to step F103*a* in the aforementioned flow chart of FIG. 3 when, for example, the depth-effect emphasizing process is indicated by the operator.

First the image data to be processed is loaded from the input image memory 32 and then is displayed on the image monitor 44, and the desired process is selected (steps F100 to F102 in FIG. 3). When the depth-effect emphasizing process is indicated at step F103*a* in FIG. 3 (step F200), first an input of the feature points of the subject is requested. Then, in the above exemplary case where the subject is a cuboid, the data of each vertex position of the cuboid subject represented by x, y, z coordinates is inputted by the operator as shown in FIG. 8 (step F201).

The procedure may be so modified as to detect such feature points automatically by the operation of the CPU 33 (step F202).

For the purpose of calculating the absolute values of the focal length f and the viewing position coordinates ($x_o$, $y_o$, $z_o$), one absolute value data is inputted (step F203). In the above routine of calculation, such data corresponds to $y_o$=−L.

Using the feature points (vertex positions of the cuboid subject) and the absolute value data ($y_o$=−L) thus inputted, calculations are executed in the above procedure to obtain the parameters in the photographing mode, i.e. the viewing position coordinates ($x_o$, $y_o$, $z_o$), the rotation angles ($\alpha$, $\beta$), the focal length f and the subject size (step F204).

In this stage, the operator is requested to input new transformation parameters for execution of the depth-effect emphasizing process, inclusive of a desired viewing distance (viewing-position displacement $\Delta d$) and a focal length $f_N$ changed in accordance therewith. Then, in response to such request, the operator inputs the desired viewing position displacement $\Delta d$ and the focal length $f_N$ (step F205).

Subsequently, new image data are produced by executing coordinate transformation and data interpolation in conformity with the viewing position displacement $\Delta d$ and the focal length $f_N$ thus inputted. In other words, there is transformed an altered image by a reprojection performed under the conditions of the viewing position displacement $\Delta d$ and the focal length $f_N$ (step F206).

The image transformation is a process of constructing an x'-y'-z' coordinate system by using the new viewing position coordinates obtained according to Eq. (13), and executing a projective transformation on the plane (uv plane 80 in FIG. 7) according to Eq. (11). It is a matter of course that the x'-y'-z' coordinate system in this case is also prescribed by the x-y-z coordinate system according to Eq. (10).

Upon completion of the image transformation, the transformed image is displayed on the image monitor 44 for the operator. And the transformation parameters are inputted again by the selection of the operator, whereby the image transformation is executed or the depth-effect emphasizing process is terminated (step F208). Upon completion of such depth-effect emphasizing process, the subsequent operation is continuously performed as shown in the flow chart of FIG. 3.

The following are the result of a simulation of calculating the parameters for the depth-effect emphasizing process in the embodiment, and also the result of the actual image transforming process.

In the above description given with regard to the method of calculating the parameters, the parameters of the straight line on the projection plane (the slope $a_1$ and the component $b_1$) are known. However, in the actual simulation, it is impossible to calculate the straight line parameters from the values read out from the monitor if the relationship of mutual correspondence between the coordinates on the monitor and the coordinates on the image-forming focal plane is unknown. For this reason, the data representing the vertical and horizontal pixel density and the center position of the photographed image are inputted first.

The pixel density is based on the value estimated in accordance with the specifications of the CCD video camera employed. Since the straight line parallel with the x-axis in the three-dimensional space passes through the position u=0 (u-coordinate of the center of the photographed image) when projected onto the image-forming focal plane (as given by Eq. (32)), the intersection of the straight lines $1_1$ and $1_2$ on the monitor is represented by the u-coordinate of the center of the image. Meanwhile the v-coordinate representing the center of the image is based on the vertical coordinate of the center of the monitor. And the straight line parameters are determined by calculations of the input points corresponding to the individual vertexes of the cuboid subject.

In Table 1, there are listed the measured values and the results of calculating the projective transformation parameters and so forth relative to a cuboid subject having a size ($\Delta x$, $\Delta y$, $\Delta z$)=(320, 460, 300 mm). As for the rotation angle $\alpha$, other parameters were calculated on the basis of the measured values. The calculated values are denoted by $-\alpha c$, $90°-\beta c$, fc which are distinguished from the measured values $-\alpha$, $90°-\beta$, f respectively.

TABLE 1

| | Measured values | | | | Calculated values | | | | | | | |
|---|---|---|---|---|---|---|---|---|---|---|---|---|
| $-\alpha$ | $90°-\beta$ | f | L | $-\alpha_C$ | $90°-\beta_C$ | $f_C$ | $-x_0$ | $z_0$ | $-x_1$ | $y_1$ | $z_1$ | |
| 0  | 14 | 30  | 2600 | 4  | 13 | 69 | 248  | 797 | 319 | 485 | 297 |     |
| 15 | "  | "   | 2490 | 9  | 12 | 77 | 996  | 736 | 290 | 463 | 264 |     |
| 30 | "  | "   | 2250 | 24 | 9  | 88 | 1817 | 623 | 285 | 569 | 247 |     |
| 0  | 27 | 12  | 1140 | 2  | 26 | 29 | 208  | 810 | 363 | 526 | 335 | (A) |
| 15 | "  | "   | 1020 | 9  | 26 | 29 | 552  | 785 | 361 | 513 | 331 | (B) |
| 30 | "  | "   | 980  | 26 | 25 | 29 | 914  | 826 | 399 | 582 | 349 | (C) |
| 0  | 36 | 9.5 | 870  |    | 35 | 22 | 233  | 944 | 412 | 590 | 382 |     |
| 15 | "  | "   | 840  | 12 | 35 | 22 | 490  | 975 | 421 | 612 | 390 |     |
| 30 | "  | "   | 700  | 28 | 34 | 23 | 774  | 916 | 408 | 606 | 365 |     |

Length in mm
Cuboid size: 320 × 460 × 300

It is understood from Table 1 that the values obtained by the above calculations are substantially equal to the measured values with the exception of the rotation angle α. Although the focal length f is considerably different in the absolute value, comparison of the absolute value is not so significant since the camera itself is not supposed to indicate an accurate value. Comparing the measured value f with the calculated value $f_c$ in the ratio, it is understood that such values are similar to each other.

Actual image transformation was experimentally performed by using the results of calculating the parameters. The examples (A), (B) and (C) in Table 1 are shown respectively in FIGS. 10, 11 and 12.

In each of the illustrations, (a) is an original image; (b) is an image so processed as to appear like the image photographed with a wide-angle lens under the condition of Δd<0, i.e. at a position displaced to be closer to the subject from the actual shooting position for the original image; and (c) is an image so processed as to appear like the image obtained with a telephotographic lens at a position displaced to recede from the subject from the actual shooting position for the original image.

The image transformation parameters (viewing position displacement Δd, and focal length $f_N$ from new viewing position) in each of the examples are as follows. The focal length $f_N$ is so set that the size of the subject image after the image transformation becomes substantially equal to the size of the original image.

Figure 12A:
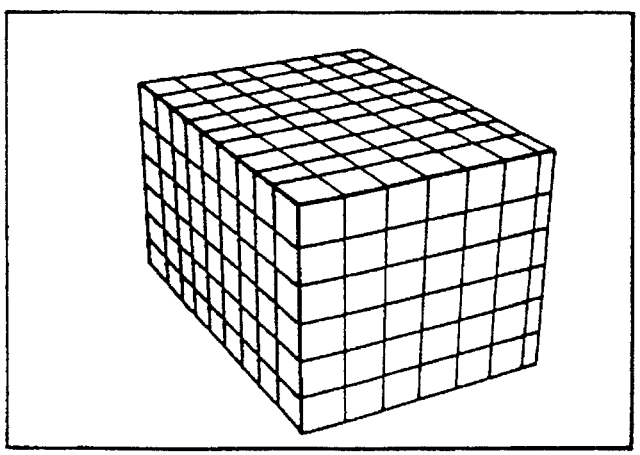
Figure 12B:
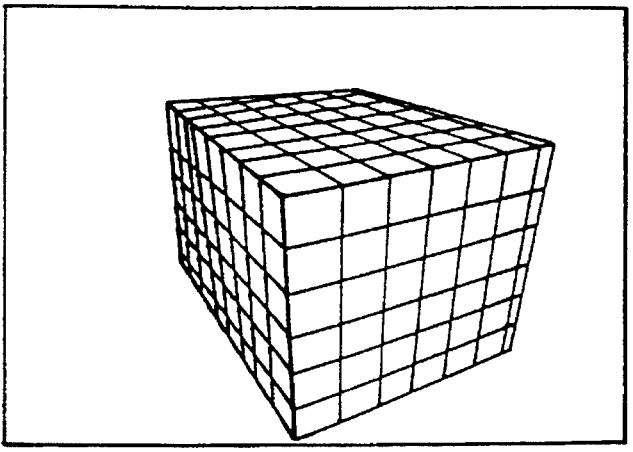
Figure 12C:
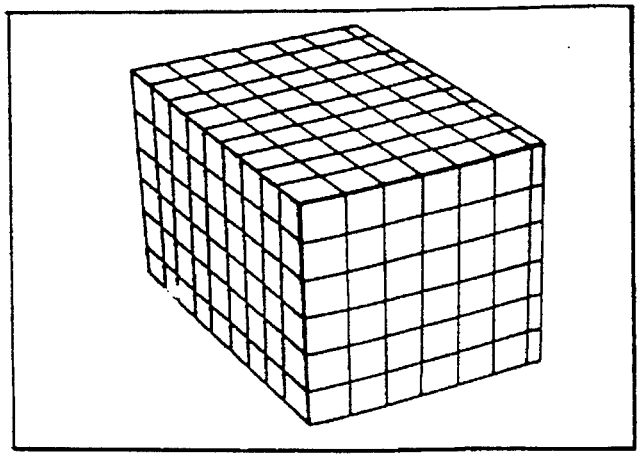

| | | |
|---|---|---|
| FIG. 10(a) | L = 1140 mm, f = 12 mm, | $f_c$ = 29 mm |
| FIG. 10(b) | Δd = −700 mm, | $f_N$ = 15 mm |
| FIG. 10(c) | Δd = 1500 mm, | $f_N$ = 59 mm |
| FIG. 11(a) | L = 1020 mm, f = 12 mm, | $f_c$ = 29 mm |
| FIG. 11(b) | Δd = −700 mm, | $f_N$ = 14 mm |
| FIG. 11(c) | Δd = 1500 mm, | $f_N$ = 60 mm |
| FIG. 12(a) | L = 980 mm, f = 12 mm, | $f_c$ = 29 mm |
| FIG. 12(b) | Δd = −800 mm, | $f_N$ = 14 mm |
| FIG. 12(c) | Δd = 2000 mm, | $f_N$ = 58 mm |

It is understood from such illustrations that the depth effect of the original image can be transformed as desired by the practical emphasizing process in the embodiment.

The depth-effect emphasizing process mentioned above saves the labor for re-photographing that may otherwise be needed in case the depth effect of the original image is unsatisfactory, and also brings about the advantage of easily producing the most adequate image in conformity with the purpose of using each input image.

Such a depth-effect emphasizing process can be applied to any motion image as well as to a still image. When a considerable time is required for the image transformation, it is possible to adopt a modified procedure which previously confirms the result of displacement of the viewing position by a wire frame and then executes a selected process for the actual data after determination of the amount of displacement.

In the embodiment mentioned, the description has been given on the exemplary cases where the tilting process and the depth-effect emphasizing process are executed by the image transforming apparatus in the system of FIG. 1. However, the constitution may be so modified as to produce a transformed image by incorporating such image transforming apparatus in a photographing unit such as a video camera or in an image output unit such as an image monitor.

As described hereinabove, the image transforming apparatus of the present invention has a processing means which is capable of geometrically transforming an input image signal by the use of geometric parameters to consequently realize the efficacy of a tilting process by such geometric image transformation. It follows that an image similar to the one formed through the tilting process can be obtained by photographing with a video camera or an electronic still camera, and the amount of the tilt is adjustable even after termination of the photographing. Therefore a remarkable advantage is attainable in enhancing the efficiency during the photographing operation and throughout the entire work up to the printing.

Furthermore, image transformation is achievable with regard to the original image in such a manner as to change the viewing position and the focal length from those in the actual photographing mode, hence altering and emphasizing the depth effect as desired after termination of the photographing to consequently eliminate the necessity of repeating the photographing operation all over again. In addition, the depth-effect emphasis is also changeable in a variety of ways after termination of the photographing, thereby ensuring an advantage that the most adequate image for each purpose of use can be obtained with facility.

What is claimed is:

1. An image transforming apparatus for transforming an image received at a focal plane of a camera comprising:

parameter generating means for generating geometric parameter signals including information representative of a focal length of the camera and a relative angle between the camera and a subject viewed by the camera during a photographing mode;

an image input means for inputting an input image signal representative of an image incident upon said focal plane of said camera during said photographing mode;

an image processing means coupled to receive said input image signal and said geometric parameter signals; wherein said image processing means performs a geometric coordinate tilt transformation of said input image signal based on said focal length and relative angle information provided in said geometric parameter signals such that the coordinates of pixel data in said input image signal are projected from said focal plane to a tilt plane rotated by said relative angle from said focal plane, and provides an output image signal representative of the geometric coordinate transform of said input image signal wherein said subject comprises a substantially rectangular object having an image, which image is incident as a trapezoidal form in the focal plane of the camera; said parameter generating means calculates focal length, relative angle, and viewing angle information based upon the dimensions of said trapezoidal form in said image input signal, wherein said parameter generating means calculates a focal length f, relative angle $\theta$, and viewing angle $\psi_1$ information based upon the dimensions of said trapezoidal form in said image input signal utilizing the following equations:

$$\theta = \sin^{-1}\left(\frac{R-1}{\sqrt{1-2R+(R^2/\cos^2\psi_1)}}\right)$$

$$\psi_1 = \tan^{-1}\left(\frac{y_b}{f}\right)$$

$$\psi_1 = \tan^{-1}\left(\frac{y_t}{f}\right)$$

$$f = \frac{y \cdot R}{R-1} \tan\theta$$

wherein said focal plane is defined by an x–y plane with an origin, $y_t$ and $y_b$ are the respective distances from the origin to the top and bottom of the image plane of the camera and y is the distance along the y axis of the image forming focal plane, $g_o$, $g_t$, and $g_b$ are respective widths of the trapezoidal form of the input image signal as measured at the origin and projected to the top and bottom of the image forming focal plane; and R is set as $R=g_o/g_b$ when $g_b<g_o$ and $R=g_o/g_t$ when $g_b>g_o$.

2. The apparatus according to claim 1, wherein said input image signal is a still image signal obtained from a video camera; and said geometric parameter signals further comprise a view angle data signal.

3. The apparatus according to claim 2, wherein
said focal length data signal of said video camera in the photographing mode is calculated by said parameter generating means based on a known shape of the subject.

4. The apparatus according to claim 2, wherein
said relative angle data signal is calculated by said parameter generating mean based on a known shape of the subject.

5. The apparatus according to claim 1, wherein said image processing means for geometrically transforming the image signal by the use of said geometric parameter signals includes a means for inputting a depth-effect emphasizing data signal representative of a viewing perspective different from the viewing perspective of the camera during said photographic mode and executes a geometric transformation of said input image signal, in combination with said tilt transformation, based on said depth-effect emphasizing data signal to emphasize the shape of the subject image as viewed from the different viewing perspective.

6. The apparatus according to claim 5, wherein said depth-effect emphasizing data signal comprises a viewing distance data signal and a focal length, said viewing distance data signal and focal length defining said different viewing perspective.

7. The apparatus according to claim 5, wherein said geometric parameter signals are calculated from feature points of said subject.

8. The apparatus according to claim 1, wherein said image processing means further comprises means for interpolating said geometrically transformed image input signal.

9. The apparatus according to claim 1, wherein said parameter generating means further comprises means for inputting at least one quanta of information selected from the group consisting of said focal length and relative angle.

10. The apparatus according to claim 9, wherein said means for inputting in said parameter generating means comprises at least one sensor selected from the group consisting of a global position sensor, detecting position and azimuth, so as to determine said at least one quanta of information selected from the group consisting of said focal length and relative angle and a geomagnetism sensor, measuring azimuth, so as to determine said relative angle.

11. The apparatus according to claim 1, wherein said parameter generating means receives geometric data for use in generating said geometric parameter signals from at least one device selected from the group consisting of said camera, a sensor means, and a console.

12. The apparatus according to claim 1, further comprising a geometric data input changer emphasizing a portion of the image by changing geometric data being input to said parameter generating means.

13. The apparatus according to claim 1, wherein said parameter generating means receives information regarding the viewing angle and focal-plane size of the camera and calculates said focal length of the camera based upon the viewing angle and focal-plane size information.

14. The apparatus according to claim 1, wherein said parameter generating means calculates said widths $g_o$, $g_t$, and $g_b$ according to the following equations:

$$g_o = \frac{bc + ad}{c + d}$$

$$g_t = \frac{bc + ad + (a-b)y_t}{c + d}$$

$$g_b = \frac{bc + ad + (a-b)y_b}{c + d}$$

where a, b, c, and d are the lengths of the upper side, lower side, distance along the y axis from the origin to the upper side, and distance along the y axis from the origin to the lower side, respectively, of the trapezoidal form of the input image signal.

15. The apparatus according to claim 1, wherein said geometric coordinate transform for tilting the focal plane is calculated as follows:

$$u = \frac{f \cdot x}{f - y\tan\theta}$$

$$v = \frac{f \cdot y}{f\cos\theta - y\sin\theta}$$

wherein x,y denote coordinates for pixel data on the focal plane, f denotes a focal length, $\theta$ denotes relative angle, and u,v denote coordinates for pixel data transformed to the tilt plane.

16. The apparatus according to claim 1, wherein said image processing means performs rotations about two-dimensional coordinate axes.

17. The apparatus according to claim 5, wherein said image processing means includes means for performing a depth-effect process comprising means for inputting feature points of the subject and at least one absolute position value;

means for calculating geometric parameters including viewing position coordinates, rotation angles, focal length, and subject size based upon said feature points and absolute position value;

means for inputting depth-effect information including viewing-position displacement and focal length change; and said image processing performs a geometric coordinate transformation of said input image signal based on said geometric parameters input by said calculating means and obtains a transformed image.

18. The apparatus according to claim 1, wherein, said camera comprises a lens having a focal point at said focal length and detector means positioned at said focal point; and wherein, said tilt plane comprises a plane rotated by said relative angle from said focal plane about said focal point.

19. The apparatus according to claim 17, wherein, said apparatus further comprises a lens and said subject being viewed is positioned away from said lens at a distance equal to or less than said focal length.

20. The apparatus according to claim 1, wherein said image processing means for geometrically transforming the image signal by the use of said geometric parameter signals includes a means for inputting a depth-effect emphasizing data signal representative of a viewing perspective different from the viewing perspective of the camera during said photographic mode and executes a geometric transformation of said input image signal, independent of said tilt transformation, based on said depth-effect emphasizing data signal to emphasize the shape of the subject image as viewed from the different viewing perspective.

21. The apparatus according to claim 20, wherein said depth-effect emphasizing data signal comprises a viewing distance data signal and a focal length, said viewing distance data signal and focal length defining said different viewing perspective.

22. The apparatus according to claim 1, wherein said image processing means performs rotations about three-dimensional coordinate axes.

* * * * *